US009703589B2

United States Patent
Zheng et al.

(10) Patent No.: US 9,703,589 B2
(45) Date of Patent: Jul. 11, 2017

(54) NETWORKING STACK OF VIRTUALIZATION SOFTWARE CONFIGURED TO SUPPORT LATENCY SENSITIVE VIRTUAL MACHINES

(71) Applicant: VMware, Inc., Palo Alto, CA (US)

(72) Inventors: Haoqiang Zheng, Mountain View, CA (US); Lenin Singaravelu, Sunnyvale, CA (US); Shilpi Agarwal, San Mateo, CA (US); Daniel Michael Hecht, San Francisco, CA (US); Garrett Smith, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 177 days.

(21) Appl. No.: 14/468,181

(22) Filed: Aug. 25, 2014

(65) Prior Publication Data
US 2015/0055499 A1    Feb. 26, 2015

Related U.S. Application Data

(60) Provisional application No. 61/870,143, filed on Aug. 26, 2013.

(51) Int. Cl.
*G06F 9/455* (2006.01)
*H04L 12/875* (2013.01)
(Continued)

(52) U.S. Cl.
CPC ...... *G06F 9/45558* (2013.01); *G06F 9/45533* (2013.01); *G06F 9/5027* (2013.01);
(Continued)

(58) Field of Classification Search
CPC ..... H04L 47/56; H04L 43/0894; H04L 43/16; H04L 47/801; G06F 9/45533;
(Continued)

(56) References Cited

U.S. PATENT DOCUMENTS 7,236,459 B1 *  6/2007  Okholm ................ H04L 1/1854
                                                    370/231
7,765,543 B1 *  7/2010  Weissman ............... G06F 9/485
                                                    714/48

(Continued)

OTHER PUBLICATIONS

"Best Practices for Performance Tuning of Latency-Sensitive Workloads in vSphere Virtual Machines," VMware Technical White Paper, May 15, 2013, pp. 1-9, available at: http://web.archive.org/web/20130515013812/http://www.vmware.com/files/pdf/techpaper/VMW-Tuning-Latency-Sensitive-Workloads.pdf.
(Continued)

*Primary Examiner* — Meng An
*Assistant Examiner* — Michael Ayers

(57) ABSTRACT

A host computer has a plurality of containers including a first container executing therein, where the host also includes a physical network interface controller (NIC). A packet handling interrupt is detected upon receipt of a first data packet associated with the first container If the first virtual machine is latency sensitive, then the packet handling interrupt is processed. If the first virtual machine is not latency sensitive, then the first data packet is queued and processing of the packet handling interrupt is delayed.

16 Claims, 6 Drawing Sheets

(51) Int. Cl.
H04L 12/26 (2006.01)
H04L 12/927 (2013.01)
G06F 13/24 (2006.01)
G06F 9/50 (2006.01)

(52) U.S. Cl.
CPC .......... *G06F 9/5033* (2013.01); *G06F 9/5088* (2013.01); *G06F 13/24* (2013.01); *H04L 43/0894* (2013.01); *H04L 43/16* (2013.01); *H04L 47/56* (2013.01); *H04L 47/801* (2013.01); *G06F 9/50* (2013.01); *G06F 2009/45575* (2013.01); *G06F 2009/45591* (2013.01); *G06F 2209/5017* (2013.01)

(58) Field of Classification Search
CPC ...... G06F 13/24; G06F 9/5033; G06F 9/5088; G06F 9/45558
See application file for complete search history.

(56) References Cited

U.S. PATENT DOCUMENTS

| | | | | |
|---|---|---|---|---|
| 8,005,022 | B2* | 8/2011 | Tripathi | H04L 12/4641 370/258 |
| 8,166,485 | B2 | 4/2012 | Krishnakumar et al. | |
| 8,364,997 | B2 | 1/2013 | Tian et al. | |
| 8,943,252 | B2 | 1/2015 | Waters et al. | |
| 2005/0281279 | A1* | 12/2005 | Dennison | H04L 12/5693 370/412 |
| 2007/0150898 | A1 | 6/2007 | Duda et al. | |
| 2010/0106874 | A1* | 4/2010 | Dominguez | G06F 13/24 710/260 |
| 2010/0125843 | A1 | 5/2010 | Saito et al. | |
| 2010/0229173 | A1 | 9/2010 | Subrahmanyam et al. | |
| 2010/0274940 | A1* | 10/2010 | Ahmad | G06F 9/4812 710/267 |
| 2011/0197003 | A1 | 8/2011 | Serebrin et al. | |
| 2011/0247001 | A1 | 10/2011 | Smith et al. | |
| 2012/0254862 | A1 | 10/2012 | Dong | |
| 2014/0215463 | A1* | 7/2014 | Hendel | G06F 9/45533 718/1 |
| 2014/0282514 | A1* | 9/2014 | Carson | G06F 9/45533 718/1 |

OTHER PUBLICATIONS

"What's New in VMware vSphere 5.1—Performance" VMware Technical Marketing Documentation, V 1.0 / Oct. 2012, Aug. 9, 2013, pp. 1-17, available at: http://web.archive.org/web/20130809042604/http://www.vmware.com/files/pdf/techpaper/Whats-New-VMware-vSphere-51-Performance-Technical-Whitepaper.pdf.
"Network I/0 Latency on VMware vSphere 5—Performance Study" VMware Technical White Paper, May 31, 2013, pp. 1-15, available at: http://web.archive.org/web/20130531071037/http://www.vmware.com/files/pdf/techpaper/network-io-latency-perf-vsphere5.pdf.
Alizadeh et al, "Less is More: Trading a little Bandwidth for Ultra-Low Latency in the Data Center" USENIX Apr. 11, 2013, pp. 1-14.
Singaravelu, "Performance and Use Cases of VMware DirectPath I/0 for Networking" VMware VROOM! Blog Dec. 6, 2010, pp. 1-8, available at: http://blogs.vmware.com/performance/2010/12/performance-and-use-cases-of-vmware-directpath-io-for-networking.html.
Li et al, "Affinity-Aware Dynamic Pinning Scheduling for Virtual Machines" 2nd IEEE International Conference on Cloud Computing Technology and Science, Nov. 30, 2010, pp. 242-249.
International Search Report mailed Dec. 3, 2014 in counterpart PCT Application PCT/US2014/052555.
International Search Report mailed Dec. 11, 2014 in counterpart PCT Application PCT/US2014/052557.
International Search Report mailed Nov. 6, 2014 in counterpart PCT Application PCT/US2014/052560.
International Search Report mailed Nov. 10, 2014 in counterpart PCT Application PCT/US2014/052564.
"Deploying Extremely Latency-Sensitive Applications in Vmware vSphere 5.5"; Vmware Technical Whitepaper (vmware.com); Aug. 27, 2013.
"Vmware, Coreinfo and mapping logical CPU cores to physical processors"; Shogan.tech (www.shogan.co.uk) How-to website; Jun. 28, 2011.
Sean K. Barker et al., "Empirical Evaluation of Latency-sensitive Application Performance in the Cloud", Feb. 23, 2010, MMSys'10, pp. 1-2.
Adit Ranadive et al., "ResourceExchange: Latency-Aware Scheduling in Virtualized Environments with High Performance Fabrics", 2011, IEEE, pp. 45-53.
Cong Xu et al., "vSlicer: Latency-Aware Virtual Machine Scheduling via Differentiated-Frequency CPU Slicing", 2012, Purdue University Purdue e-Pubs, pp. 1-14.
B487.04, U.S. Appl. No. 14/468,138 dated Apr. 29, 2016 consists of 8 pages.
Australian Search Report dated Oct. 3, 2016 in related Australian Patent Appliction 2014311463.

\* cited by examiner

| Latency Sensitivity Table 155 ||
|---|---|
| VM ID $210_1$ | Latency Sensitivity Indicator = N |
| VM ID $210_2$ | Latency Sensitivity Indicator = Y |

NETWORKING STACK OF VIRTUALIZATION SOFTWARE CONFIGURED TO SUPPORT LATENCY SENSITIVE VIRTUAL MACHINES

CROSS REFERENCE TO OTHER APPLICATIONS

This application claims priority to U.S. Provisional Patent Application No. 61/870,143, entitled "TECHNIQUES TO SUPPORT HIGHLY LATENCY SENSITIVE VMs," filed Aug. 26, 2013, the contents of which is incorporated herein by reference. This application is related to: U.S. patent application Ser. No. 14/468,121, entitled "CPU Scheduler Configured to Support Latency Sensitive Virtual Machines", filed Aug. 25, 2014; U.S. patent application Ser. No. 14/468,122, entitled "Virtual Machine Monitor Configured to Support Latency Sensitive Virtual Machines", filed Aug. 25, 2014; and U.S. patent application Ser. No. 14/468,138, entitled "Pass-through Network Interface Controller Configured to Support Latency Sensitive Virtual Machines", filed Aug. 25, 2014, the entire contents of which are incorporated herein by reference.

BACKGROUND

Applications characterized as "latency sensitive" are, typically, highly susceptible to execution delays and jitter (i.e., unpredictability) introduced by the computing environment in which these applications run. Examples of latency sensitive applications include financial trading systems, which usually require split-second response time when performing functions such as pricing securities or executing and settling trades.

Execution delay and jitter are often present in networked virtualized computing environments. Such computing environments frequently include a number of virtual machines (VMs) that execute one or more applications that rely on network communications. These virtualized applications communicate over the network by transmitting data packets to other nodes on the network using a virtual network interface controller (or VNIC) of the VM, which is a software emulation of a physical network interface controller (or PNIC). The use of a VNIC for network communication results in latency and jitter for a number of reasons.

First, VNIC-based communication requires transmitted and received packets to be processed by layers of networking software not required for packets that are directly transmitted and received over a PNIC. For example, data packets that are transmitted by a virtualized application are often transmitted first to a VNIC. Then, from the VNIC, the packets are passed to software modules executing in a hypervisor. Once the packets are processed by the hypervisor, they are then transmitted from the hypervisor to the PNIC of the host computer for subsequent delivery over the network. A similar, although reverse, flow is employed for data packets that are to be received by the virtualized application. Each step in the flow entails processing of the data packets and, therefore, introduces latency.

Further, VNICs are often configured to queue (or coalesce interrupts corresponding to) data packets before passing the packets to the hypervisor. While packet queueing minimizes the number of kernel calls to the hypervisor to transmit the packets, latency sensitive virtualized applications that require almost instantaneous packet transmission (such as, for example, telecommunications applications) suffer from having packets queued at a VNIC.

VNICs are also configured to consolidate inbound data packets using a scheme known as large receive offload (or LRO). Using LRO, smaller Transmission Control Protocol (TCP) packets that are received at a VNIC are consolidated into larger TCP packets before being sent from the VNIC to the virtualized application. This results in fewer TCP acknowledgments being sent from the virtualized application to the transmitter of the TCP packets. Thus, TCP packets can experience transmission delay.

Finally, a PNIC for a host computer may be configured to queue data packets that it receives. As is the case with the queuing of data packets at a VNIC, queuing data packets at a PNIC often introduces unacceptable delays for latency senstive virtualized applications.

SUMMARY

A method of transmitting and receiving data packets to and from a container executing in a host computer is provided, the host computer having a plurality of containers executing therein, and where the host computer connects to a network through a physical NIC. The method comprises the steps of detecting a packet handling interrupt upon receiving a first data packet that is associated with the container, and determining whether the container is latency sensitive. The method further comprises the step of processing the packet handling interrupt if the container is latency sensitive. The method further comprises, if the container is not latency sensitive, then queueing the first data packet and delaying processing of the packet handling interrupt.

Further embodiments provide a non-transitory computer-readable medium that includes instructions that, when executed, enable a host computer to implement one or more aspects of the above method, as well as a computing system that includes a host computer, a physical NIC, and a virtual NIC that is configured to implement one or more aspects of the above method.

BRIEF DESCRIPTION OF THE DRAWINGS

FIG. 2 is a block diagram that depicts a table for storing latency sensitivity information, according to embodiments.

DETAILED DESCRIPTION

Figure 1:
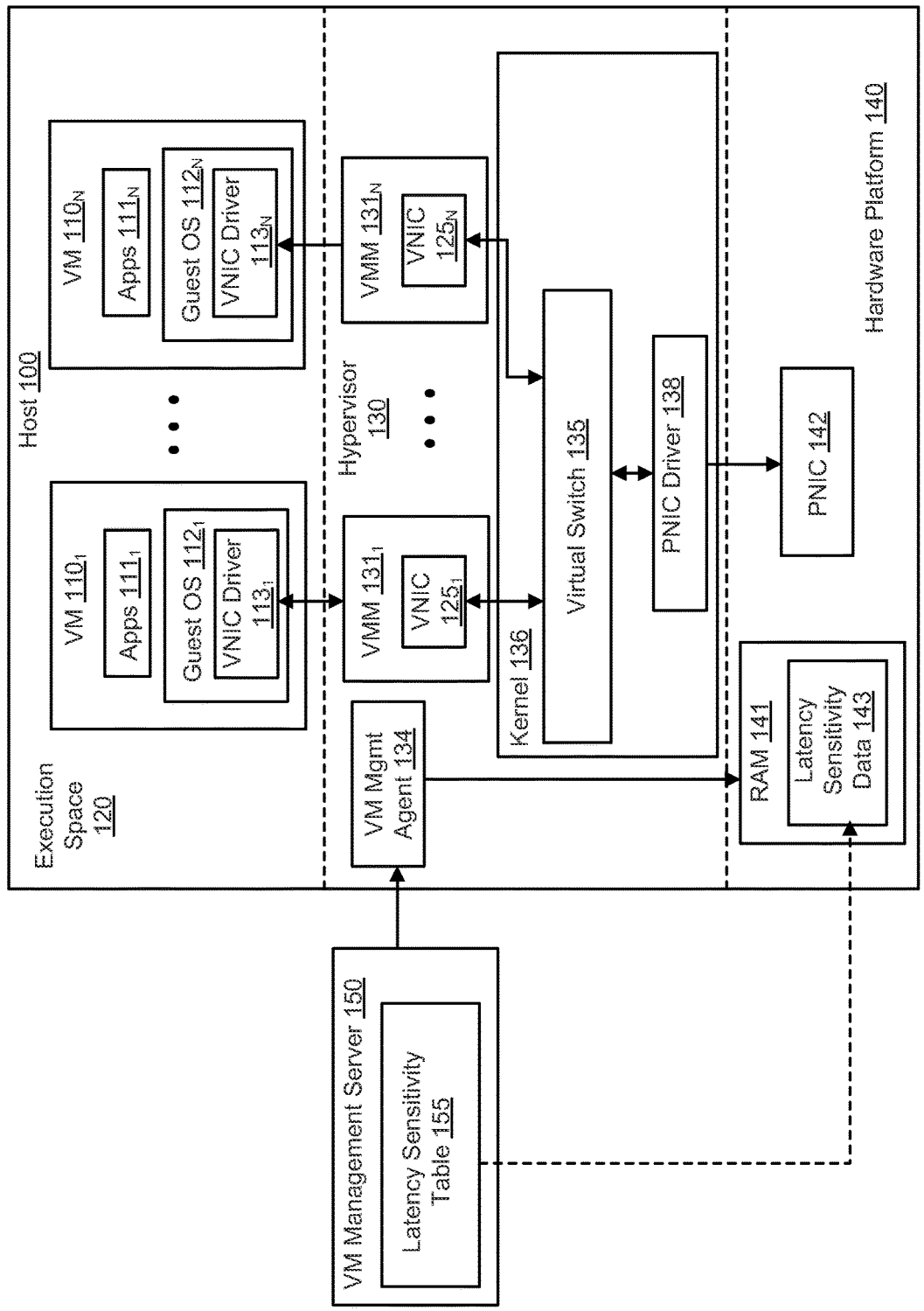
FIG. 1 is a conceptual diagram depicting a virtualized computing environment in which one or more embodiments may be implemented.

FIG. 1 depicts a virtualized computing environment in which one or more embodiments may be implemented. As shown, the computing environment includes a host computer 100 and a virtual machine (VM) management server 150. VM management server 150 communicates with host computer 100 over a local connection or, alternatively, over a remote network connection.

Host computer 100 is, in embodiments, a general-purpose computer that supports the execution of an operating system and one more application programs therein. In order to execute the various components that comprise a virtualized computing platform, host computer 100 is typically a server class computer. However, host computer 100 may also be a desktop or laptop computer.

As shown in FIG. 1, host computer 100 is logically divided into three components. First, execution space 120 supports the execution of user-level (i.e., non-kernel level) programs. User-level programs are non-privileged, meaning that they cannot perform certain privileged functions, such as executing privileged instructions or accessing certain protected regions of system memory. Among the programs that execution space 120 supports are virtual machines.

Virtual machines are software implementations of physical computing devices and execute programs much like a physical computer. In embodiments, a virtual machine implements, in software, a computing platform that supports the execution of software applications under the control of a guest operating system (OS). As such, virtual machines typically emulate a particular computing architecture. In FIG. 1, execution space 120 includes VMs $110_1$-$110_N$. Each VM 110 shown supports the execution of one or more applications 111, each of which executes under the control of a particular guest OS 112. Applications 111 are user-level (non-kernel) programs, such as, for example, word processors or spreadsheet programs. Each of the depicted guest OS' 112 may be one of the well-known commodity operating systems, such as any of the versions of the Windows® operating system from Microsoft Corp., the Linux® operating system, or MacOS® X from Apple, Inc. It should be noted that the applications and guest OS' may vary from one VM to another. Thus, applications $111_1$ in VM $110_1$ may include Microsoft's Word® and Excel® applications running under the control of Windows® 7 as guest OS $112_1$. By contrast, applications $111_N$ in VM $110_N$ may include the Safari® web browser running under the control of MacOS® X as guest OS $112_N$. As shown in FIG. 1, each of VMs $110_1$-$110_N$ communicates with a hypervisor component, referred to herein as hypervisor 130.

Hypervisor 130, as depicted in FIG. 1, provides the operating system platform for running processes on computer host 100. Hypervisor 130 controls all hardware devices within computer host 100 and manages system resources for all applications running therein. Among the core functions that hypervisor 130 provides are console services, file system services, device drivers, resource scheduling, and network data transmission. Further, hypervisor 130 implements software components that provide for the instantiation of one or more virtual machines on the host computer.

As depicted in the embodiment of FIG. 1, hypervisor 130 includes virtual machine monitors (VMMs) $131_1$-$131_N$. Each VMM 131 corresponds to an executing VM 110. Thus, VMM $131_1$ corresponds to VM $110_1$, VMM $131_2$ corresponds to VM $110_2$, and so on. Each VMM 131 is a software layer that provides a virtual hardware platform to the guest OS for the corresponding virtual machine. It is through a particular VMM 131 that a corresponding VM accesses services provided by the kernel component of hypervisor 130 (shown in FIG. 1 as kernel 136). Among the functions carried out by kernel 136 are memory management, providing networking and storage stacks, and process scheduling.

Each VMM 131 in FIG. 1 implements a virtual hardware platform for the corresponding VM 110. Among the components of the implemented virtual hardware platform are one or more VNICs 125. Thus, VMM $131_1$ implements VNIC $125_1$, VMM $131_2$ implements VNIC $125_2$, and so on.

Each VNIC 125 appears to be a physical network adapter (i.e., a physical network interface controller, or PNIC) from the standpoint of the applications 111 and the guest OS 112 that run in the corresponding VM 110. In this way, a virtualized guest operating system that runs within a virtual machine may transmit and receive data packets in the same way that an operating system that runs directly on a computer host (i.e., in a non-virtualized manner) transmits and receives data packets using PNICs. However, from the standpoint of hypervisor 130 (which, in typical embodiments, executes directly on computer host 100), each VNIC 125 is a source application from which it receives data packets that are to be transmitted over a network via one or more PNICs (which will be described in further detail below) of computer host 100, or a destination application for data packets that are received over the network via a PNIC of computer host 100. Alternatively, hypervisor 130 may transmit data packets between virtual machines that execute on computer host 100 without transmitting those data packets over the network (i.e., via any of the PNICs of computer host 100).

In one or more embodiments, kernel 136 serves as a liaison between VMs 110 and the physical hardware of computer host 100. Kernel 136 is a central operating system component, and executes directly on host 100. In embodiments, kernel 136 allocates memory, schedules access to physical CPUs, and manages access to physical hardware devices connected to computer host 100.

As shown in FIG. 1, kernel 136 implements a virtual switch 135. Virtual switch 135 enables virtual machines executing on computer host 100 to communicate with each other using the same protocols as physical switches. Virtual switch 135 emulates a physical network switch by allowing virtual machines to connect to one or more ports (via the corresponding VNIC of the virtual machines), accepting frames of data (i.e., typically Ethernet frames) from the VNICs, and forwarding the frames to other VNICs connected to other ports of the virtual switch, or, alternatively, to a PNIC of computer host 100. Thus, virtual switch 135 is a software emulation of a physical switch operating at the data-link layer.

As shown in FIG. 1, VNIC $125_1$ and VNIC $125_N$ (which correspond to VMMs $131_1$ and $131_N$, respectively) connect to virtual switch 135. Further, virtual switch 135 connects to PNIC driver 138. According to embodiments, PNIC driver 138 is a device driver for a physical network adapter connected to computer host 100. PNIC driver 138 receives data from virtual switch 138 and transmits the received data over the network via a PNIC for which PNIC driver 138 serves as device driver. PNIC driver 138 also handles incoming data from the PNIC and, among other things, forwards the received data to virtual machines via virtual switch 135.

FIG. 1 also depicts hardware platform 140, which is another component of computer host 100. Hardware platform 140 includes all physical devices, channels, and adapters of computer host 100. Hardware platform 140 includes network adapters (i.e., PNICs), for network communication, as well as host bus adapters (HBAs) (not shown), which enable communication to external storage devices. In addition, hardware platform 140 includes the physical central processing units (CPUs) of computer host 100.

Hardware platform 140 also includes a random access memory (RAM) 141, which, among other things, stores programs currently in execution, as well as data required for such programs. Moreover, RAM 141 stores the various data structures needed to support network data communication.

For instance, the various data components that comprise virtual switch 135 (i.e., virtual ports, routing tables, and the like) are stored in RAM 141.

Further, as shown in FIG. 1, hardware platform also includes PNIC 142. PNIC 142 is a computer hardware component that enables computer host 100 to connect to a computer network. PNIC 142 implements the electronic circuitry required to communicate using a specific physical layer and data link layer standard, such as Ethernet, Wi-Fi, or Token Ring. PNIC 142 (which is driven by PNC driver 138) may use one or more techniques to indicate the availability of packets to transfer. For example, PNIC 142 may operate in a polling mode, where a CPU executes a program to examine the status of the PNIC. On the other hand, when PNIC 142 operates in an interrupt-driven mode, the PNIC alerts the CPU (via a generated interrupt) that it is ready to transfer data.

PNIC 142 is typically configured with one or more data queues. In some cases, the PNIC is configured with a single transmit queue (for transmitting outbound packets to the network) and a single receive queue (for receiving inbound packets from the network). Alternatively, PNIC 142 may be a multi-queue PNIC. A multi-queue PNIC has more than one transmit queue and more than one receive queue, where each transmit or receive queue can be allocated to a specific use. For example, a multi-queue PNIC 142 may be configured with two sets of transmit/receive queues. In this embodiment, a first transmit and a first receive queue may be connected to (i.e., driven by) a PNIC driver 138 connected to a first virtual switch, while a second transmit and a second receive queue is connected to a PNIC driver 138 connected to a second virtual switch. Thus, data packets transmitted by an external source for delivery to a virtual machine connected to the first virtual switch are placed (by PNIC 142) in the first/receive queue. By contrast, data packets received by PNIC 142 that are destined for a virtual machine connected to the second virtual switch are placed by PNIC 142 in the second receive queue.

In order to support the networking changes required for executing latency sensitive virtual machines, the embodiment depicted in FIG. 1 includes a VM management server 150. VM management server 150 is, in embodiments, a server application executing either within computer host 100, or (as shown in FIG. 1) remotely from computer host 100. Embodiments of VM management server 150 provide an interface (such as a graphical user interface (or GUI)) through which a system administrator may define, configure, and deploy virtual machines for execution on one or more host computers.

In addition, VM management server 150 provides for the configuration of virtual machines as highly latency sensitive virtual machines. According to one or more embodiments, VM management server 150 maintains a latency sensitivity table 155, which defines latency sensitivity characteristics of virtual machines. Latency sensitivity table 155 is described in further detail below.

As shown in FIG. 1, VM management server 150 communicates with computer host 100, either through a direct local connection or over a computer network. In order to facilitate such communication, VM management agent 134 executes on computer host 100. Although VM management agent 134 is not part of kernel 136, embodiments of the agent run at the hypervisor level within hypervisor 130. However, in other embodiments, VM management agent 134 may run as a user program within execution space 120.

VM management agent 134 receives instructions from VM management server 150 and carries out tasks on behalf of VM management server 150. Among the tasks performed by VM management agent 134 are the configuration and instantiation of virtual machines. One aspect of the configuration of a virtual machine is whether that virtual machine is highly latency sensitive. Thus, VM management agent 134 receives a copy of latency sensitivity table 155 and saves the underlying data within RAM 141 as latency sensitivity data 143. As shown in FIG. 1, once latency sensitivity data 141 is saved to RAM, software modules associated with the transmission of data packets to and from virtual machines access that information in order to determine which virtual machines are highly latency sensitive. Upon determining that one or more virtual machines are highly latency sensitive, networking software (residing in either the VNIC or in the kernel) regulates the transmission of data packets in support of virtual machines that are latency sensitive.

FIG. 2 is a block diagram that depicts one embodiment of latency sensitivity table 155. As shown in the figure, latency sensitivity table 155 stores multiple rows of data, where each row corresponds to a particular virtual machine within host 100. Each virtual machine is identified on the host by a unique VM ID 210. A VM ID 210 may be any unique binary or alphanumeric value that is associated with a virtual machine. As shown in FIG. 2, latency sensitivity table 155 has a plurality of entries, each of which corresponds to a virtual machine VM 110 depicted in FIG. 1.

For each VM ID 210, latency sensitivity table 155 stores a latency sensitivity indicator. This indicator may take on two distinct values (such as Y or N), which indicates whether the corresponding virtual machine is highly latency sensitive. In other embodiments, the latency sensitive indicator may take on more than two values (e.g., High, Medium, Low, or Normal), to provide for specifying different degrees of latency sensitivity for the corresponding virtual machine. In FIG. 2, VM ID $210_1$ (corresponding to VM $110_1$) identifies a virtual machine that is not highly latency sensitive because its latency sensitivity indicator is set to N. On the other hand, VM ID $210_2$ (which corresponds to VM $110_2$) identifies a virtual machine that is highly latency sensitive because its corresponding latency sensitivity indicator is set to Y. For example, VM $110_1$ might be a virtual machine that runs a batch processing application (such as a monthly billing system), which typically does not require split-second response time and is generally unaffected by the jitter that may occur in a virtualized computing environment. On the other hand, VM $110_2$ may be a real-time financial trading application, which is a representative latency sensitive application.

According to embodiments, a VM that is defined with latency sensitivity indicator of Y (or some other positive indicator) is treated by the networking software as highly latency sensitive. That is, the networking software in the VNIC and kernel is configured to determine which virtual machines are highly latency sensitive (based on the aforementioned criteria), and to transmit and receive data packets for those virtual machine in such a way so as to minimize any transmission delay for the packets. Thus, the data packets transmitted and received by VM $110_2$ (a highly latency sensitive virtual machine) are subjected to a minimal amount of delay (i.e., latency). By contrast, the data packets transmitted and received by VM $110_1$ (which is not latency sensitive) are not transmitted in a way so as to minimize any delay in the delivery of the packets. Rather, the data packets of VM $110_1$ are handled so as to improve the overall efficiency of execution of all virtual machines on computer host 100, which may nonetheless result in delays in packet delivery for the VM.

Figure 3:
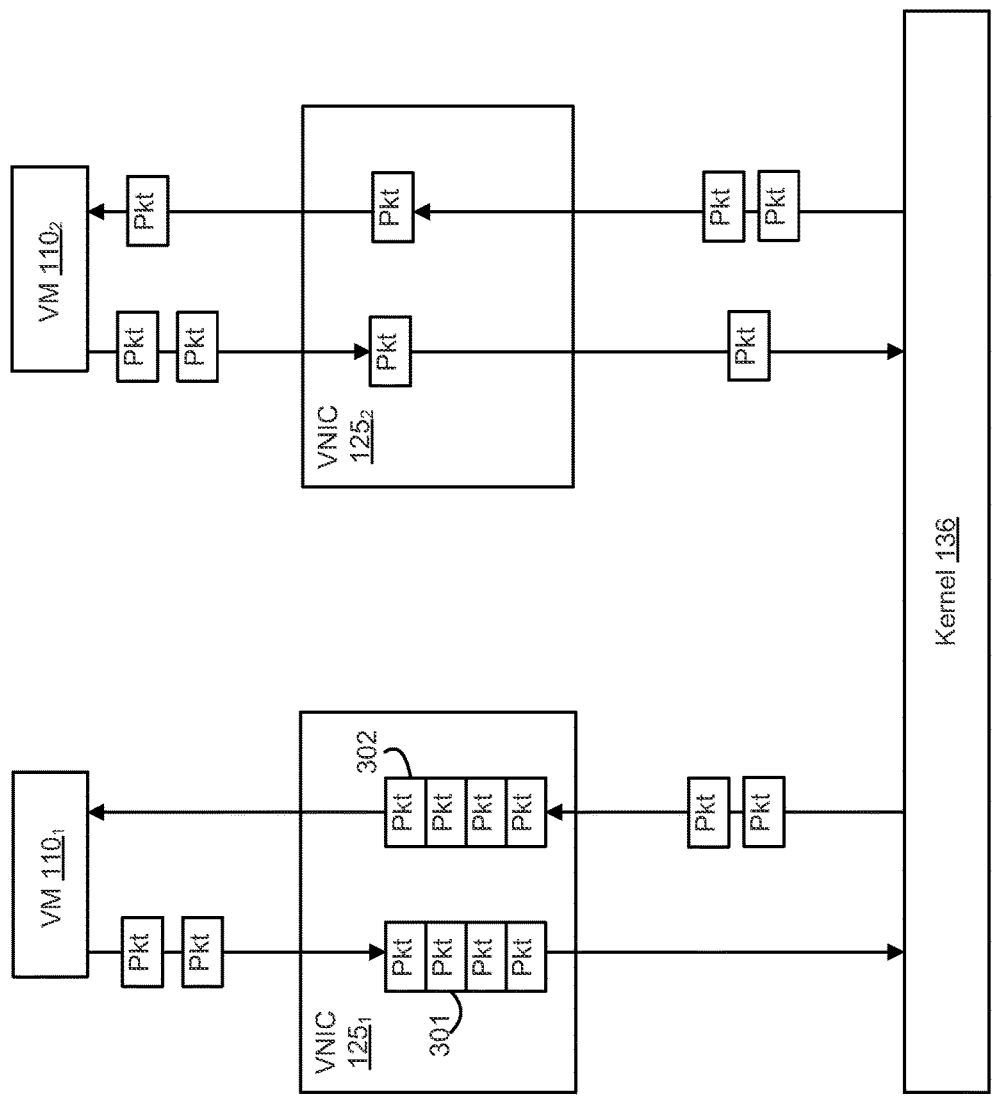
FIG. 3 is a conceptual diagram that illustrates disabling of data packet queuing in a VNIC, according to embodiments.

FIG. 3 is a conceptual diagram that illustrates the disabling of data packet queuing in a VNIC of a highly latency sensitive virtual machine, according to one or more embodiments. Data packet queuing (also referred to as interrupt coalescing) entails a delay in transmission of an interrupt from a physical or virtual network interface (such as a VNIC) until a predetermined number of data packets have been received by the network interface. Thus, a VNIC that performs packet queuing does not immediately transmit an interrupt upon receiving a data packet, whether from the corresponding guest virtual machine or from the hypervisor. Rather, the VNIC delays the posting of the interrupt until several packets have been received and queued therein.

Conceptually, the packets may be viewed as being queued within the VNIC itself in either a transmit queue or a receive queue. The transmit queue for the VNIC queues packets that are transmitted by a process executing in the guest virtual machine that corresponds to the VNIC, and that are destined for another virtual machine executing on the same host, or, alternatively, to a network destination that is external to the host. The receive queue, on the other hand, queues packets that are transmitted by a process executing external to the virtual machine that corresponds to the VNIC, and that are destined for that virtual machine. It should be noted that packet queuing may occur, in embodiments, in the guest operating system (for packets to be transmitted from the virtual machine) and in the kernel (for packets to be received by the virtual machine).

Packet queuing reduces the interrupt rate at which the VNIC operates. That is, with packet queuing, the VNIC transmits fewer interrupts to the kernel for packets that are to be transmitted from the virtual machine. Such an interrupt comprises, in one or more embodiments, a kernel call that informs the kernel that the VNIC has a certain number of data packets that are ready to be transmitted. Similarly, with packet queuing, the VNIC transmits fewer interrupts to the guest virtual machine for packets that are to be received by the virtual machine. Such an interrupt comprises, in one or more embodiments, a software interrupt that the VNIC posts to an interrupt handler that executes in the guest virtual machine, where the software interrupt informs the interrupt handler that one or more packets have been received at the VNIC. The fewer interrupts generated by the VNIC when the VNIC queues data packets results in fewer context switches by the kernel and by the guest operating system. However, packet queuing can add jitter, and in some cases, may have a noticeable impact on average latency, especially with input/output (I/O) bound applications.

In FIG. 3, VM $110_1$ is a virtual machine that is not highly latency sensitive, while VM $110_2$ is highly latency sensitive. This is the case based on the corresponding entries for these virtual machines in latency sensitivity table 155, depicted in FIG. 2. Because VM $110_1$ is not highly latency sensitive, VNIC $125_1$ (i.e., the VNIC that corresponds to VM $110_1$) performs packet queuing for the VM. This is depicted by queues 301 and 302, which are depicted as residing within VNIC $125_1$. As shown, queue 301 stores packets that are transmitted from VM $110_1$. These packets are queued (or, equivalently, interrupts are coalesced) in VNIC $125_1$ until queue 301 becomes full, or, alternatively, when a timer (not shown) associated with queue 301 expires. Once VNIC $125_1$ determines that the packets stored in queue 301 are to be transmitted, VNIC $125_1$ generates a software interrupt (or, in embodiments, makes a kernel call) to kernel 136 to inform the kernel that the VNIC has a certain number of packets that are ready to be transmitted.

Similarly, queue 302 stores packets that are transmitted to VNIC $125_1$ via kernel 136. In embodiments, a transmitter, such as another virtual machine or an application external to computer host 100, transmits data packets for delivery to VM $110_1$. The packets are routed to computer host 100, after which they are forwarded, by software executing in kernel 136, to VNIC $125_1$. VNIC $125_1$ then queues the packets in queue 302. VNIC $125_1$ then generates a software interrupt that is received by an interrupt handler executing under control of the guest operating system in VM $110_1$. VNIC $125_1$ generates the interrupt when, for example, the number of packets in queue 302 exceeds a threshold value or when the amount of time that packets are queued in queue 302 exceeds a threshold amount of time. It should be noted that, in the embodiment illustrated in FIG. 2, queue 302 resides within VNIC $125_1$. However, in other embodiments, packets may be queued within one or more data buffers in kernel 136. In such embodiments, when kernel 136 determines that the number of queued packets exceeds some threshold, or that the packets have been queued for an amount of time that exceeds a threshold time, kernel 136 then posts a software interrupt to VNIC $125_1$ indicating that kernel 136 has a certain number of packets that are ready to be transmitted to VNIC $125_1$.

In contrast with VM $110_k$, VM $110_2$ is a highly latency sensitive virtual machine (based on the corresponding entry for VM $110_2$ in latency sensitivity table 155, depicted in FIG. 2). As previously mentioned, the networking software in kernel 136 and VNIC $125_2$ determines that VNIC $125_2$ is associated with a highly latency sensitive virtual machine (i.e., VM $110_2$) and dynamically disables packet queuing for VNIC $125_2$. Thus, as shown in FIG. 3, packets that arrive at VNIC $125_2$ from VM $110_2$ are not queued at VNIC $125_2$. Instead, as packets arrive from VM $110_2$, they are immediately transmitted to kernel 136 for delivery, either to another virtual machine or to an external network destination. In one or more embodiments, VNIC $125_2$ posts an interrupt (or makes a kernel call) to kernel 136 for each packet that arrives from VM $110_2$. The interrupt or kernel call indicates that VNIC $125_2$ has a packet that is ready for transmission.

As shown in FIG. 3, packets that are received by VNIC $125_2$ from kernel 136 are also not queued at VNIC $125_2$. Rather, these packets are immediately transmitted, without delay, to VM $110_2$. For example, in one or more embodiments, VNIC $125_2$ posts a software interrupt to an interrupt handler executing in VM $110_2$ to indicate that VNIC $125_2$ has a packet that is ready to be transmitted to the virtual machine. In other embodiments, kernel 136 posts an interrupt to VNIC $125_2$, which then immediately receives and forwards the packet to VM $110_2$. Thus, the interrupt rate for VNIC $125_2$, for both transmitted and received packets, is higher than that of VNIC $125_1$, which generally results in lower network latency for VNIC $125_2$ as compared to VNIC $125_1$.

Figure 4:
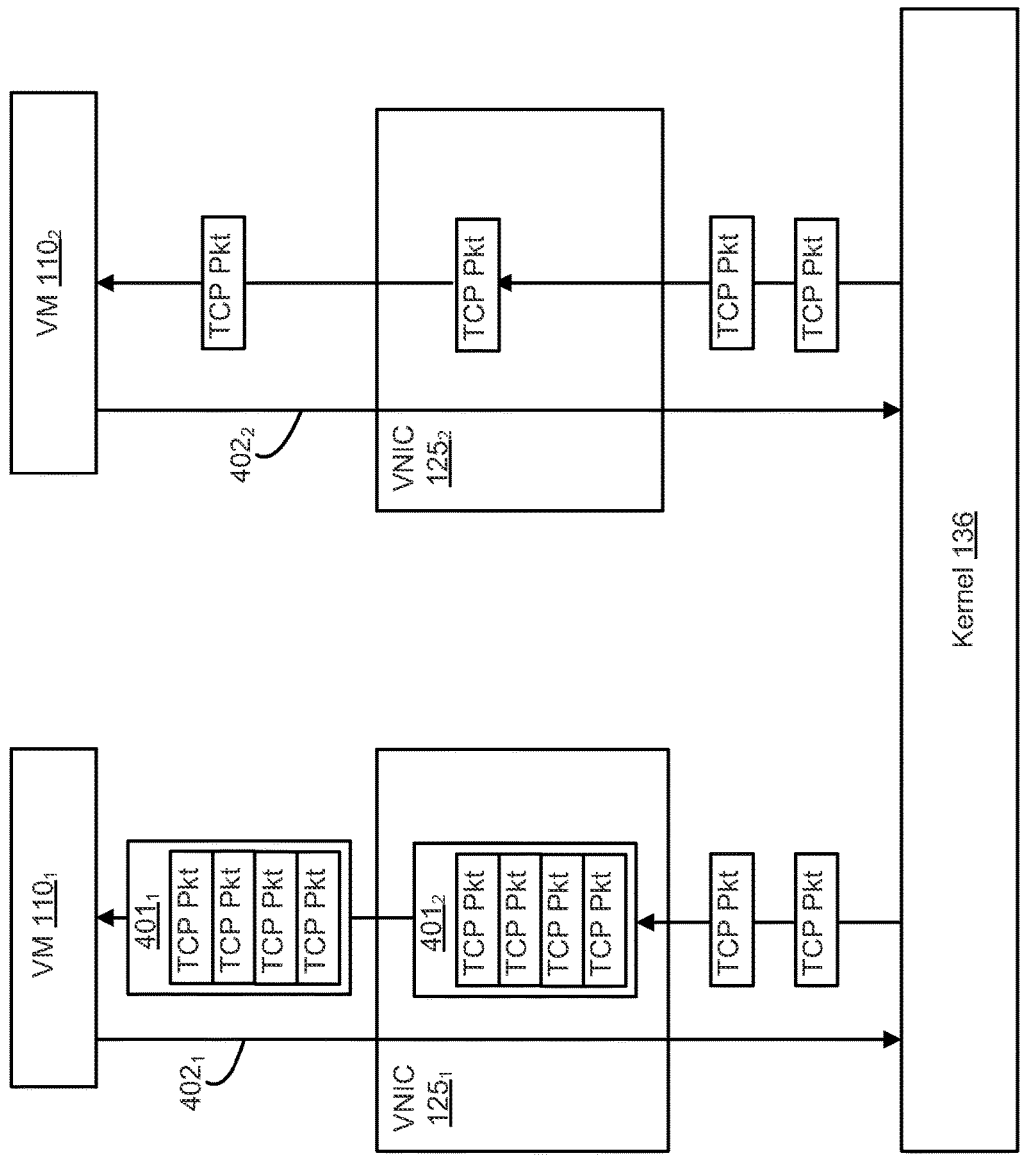
FIG. 4 is a conceptual diagram that illustrates disabling of LRO in a VNIC, according to embodiments.

FIG. 4 is a conceptual diagram that illustrates the disabling of LRO in a VNIC of a highly latency sensitive virtual machine, according to embodiments. LRO is a technique by which multiple incoming packets to a network interface (e.g., a physical NIC or a VNIC) are consolidated into a larger packet before being passed to higher layers of the networking stack. This has the effect of reducing the number of packets that require processing at the receiving end of a transmission. LRO is typically performed at the transport layer (i.e., at the TCP layer in a TCP/IP-based network). That is, LRO entails the aggregation of smaller TCP packets into larger TCP packets before being transmitted up the network stack. Since the receipt of a TCP packet give rise to an acknowledgement by the recipient, the use of LRO entails fewer TCP acknowledgements than a scheme that does not use LRO.

As shown in FIG. 4, VM $110_1$ is not a highly latency sensitive virtual machine, while VM $110_2$ is a highly latency sensitive virtual machine. As was the case for VMs $110_1$ and $110_2$ in FIG. 3, the latency sensitivity of each of the VMs in FIG. 4 is determined based upon the entries in latency sensitivity table 155, depicted in FIG. 2. Since VM $110_1$ is not highly latency sensitive, then, in the embodiment shown, VNIC $125_1$ (which corresponds to VM $110_1$) performs LRO for received TCP packets. That is, the transport layer software in kernel 136 forwards TCP packets to VNIC $125_1$, where those packets are then consolidated into larger TCP packets before being transmitted to VM $110_1$. Thus, as shown in the figure, TCP packet $401_1$ is currently being transmitted from VNIC $125_1$ to VM $110_1$. More specifically, TCP layer software in VNIC $125_1$ communicates TCP packet $401_1$ to transport layer software executing under control of the guest operating system of VM $110_1$. Further, TCP packet $401_2$ is currently being assembled from received (smaller) TCP packets. Thus, when TCP packet $401_2$ is fully formed, VNIC $125_1$ will initiate transmission of this packet as well.

Since TCP is a reliable data delivery service, a TCP sender relies upon acknowledgements to determine whether a given TCP packet should be retransmitted. Thus, as shown in FIG. 2, upon receipt of TCP packet $401_1$, and acknowledgment $402_1$ is sent from transport layer software in VM $110_1$ to VNIC $125_1$, and on to kernel 136. It should be noted that kernel 136 then transmits this acknowledgment toward the original sender of the packets consolidated in TCP packet $401_1$. When the acknowledgement is received, then the original sender of the packets consolidated in TCP packet $401_1$ initiates a next packet transmission. It should also be noted that the frequency of the acknowledgments $402_1$ from VM $110_1$ is less than the frequency of packet transmission to VNIC $125_1$. This is due to the consolidation of smaller TCP packets into larger TCP packets 401 at VNIC $125_1$.

In contrast with VM $110_1$, VM $110_2$ is a highly latency sensitive virtual machine (based upon the entry corresponding to VM $110_1$ in latency sensitivity table 155, depicted in FIG. 2). The transport layer software of VNIC $125_2$ (which corresponds to VM $110_2$) determines that VM $110_2$ is highly latency sensitive and, based on this, disables LRO processing in the VNIC. Thus, as shown in the figure, TCP packets that arrive at VNIC $125_2$ from kernel 136 are not consolidated by the VNIC into larger TCP packets. Rather, the received TCP packets are immediately forwarded to VM $110_2$, where transport layer software executing therein processes the packets. Further, as shown in the figure, the transport layer software of VM $110_2$ sends acknowledgements $402_2$ to VNIC $125_2$, and on to kernel 136. As with the acknowledgements $402_1$ transmitted by VM $110_1$, acknowledgments $402_2$ are forwarded by kernel 136 to the original sender of the TCP packets. However, the frequency of acknowledgements $402_2$ is greater than that of acknowledgements $402_1$ because the TCP packets received by VNIC $125_2$ are not consolidated. Therefore, the original sender of TCP packets to VNIC $125_2$ will receive a greater number of acknowledgements on a more frequent basis. This tends to reduce network latency, as more frequent acknowledgements give rise to more frequent transmission and, therefore, lower transmission delay.

Figure 5:
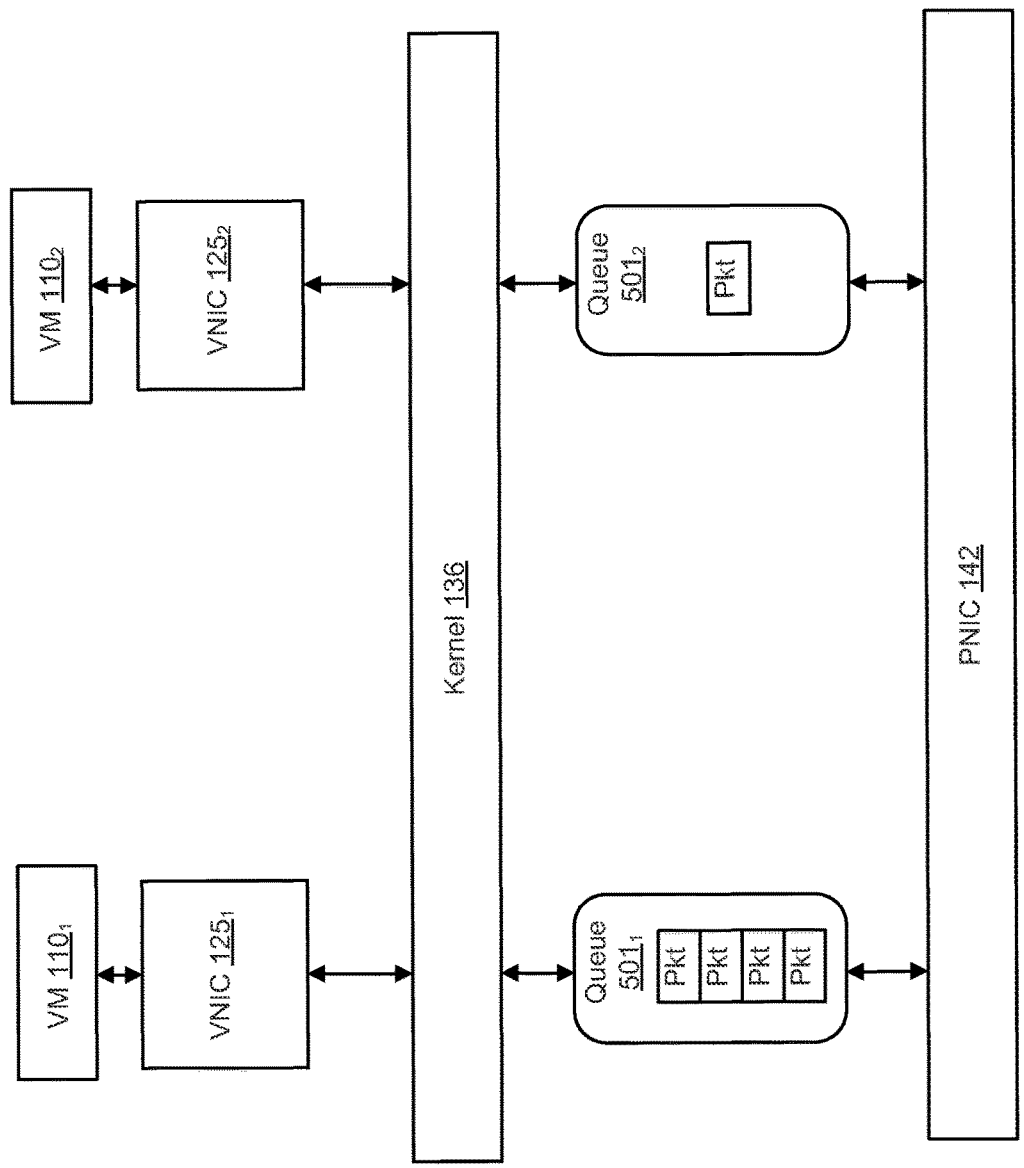
FIG. 5 is a conceptual diagram that depicts changing the interrupt rate of a multi-queue PNIC, according to embodiments.

FIG. 5 is a conceptual diagram illustrating the adjustment of the interrupt rate in a multi-queue PNIC to accommodate a highly latency sensitive virtual machine, according to one or more embodiments. As mentioned earlier, PNICs are typically configured with one or more transmit and receive queues. When data packets are received at a PNIC, whether from the network that the PNIC connects to or from the operating system that manages the PNIC, the packets are placed into either the transmit queue (for outbound packets) or the receive queue (for inbound packets). The PNIC is configured with a certain interrupt rate, whereby the PNIC generates interrupts to the host when it has packets that are ready to be received from the receive queue or transmitted from the transmit queue. As was the case for VNICs, PNICs may queue data packets and have the packets transmitted (or received) once the queue length exceeds a threshold. At such time, an interrupt is generated and the packets are transmitted or received by the host, depending on the queue that the packets reside in.

Multi-queue PNICs are conceptually similar to single queue PNICs. Multi-queue PNICs have more than one transmit queue and more than one receive queue. This is advantageous because it increases the throughput of the PNIC, especially on multiprocessor computer hosts. Further, each transmit or receive queue may be dedicated to a single processor, thus dividing packet processing among processors and freeing certain other processors from the task of processing packets. Further, each transmit or receive queue in a multi-queue PNIC may be assigned to one or more VNICs. That is, multi-queue PNICs are often equipped with a routing module to direct packets destined for certain virtual machines into receive queues that correspond to the VNICs of those virtual machines. In similar fashion, the kernel directs network packets transmitted by certain virtual machines to transmit queues of the PNIC that correspond to those virtual machines.

Further, the interrupt rate for a multi-queue PNIC is configurable on a per-queue level. That is, each transmit or receive queue may be configured with its own interrupt rate. This scenario is illustrated in FIG. 5. As described earlier, VM $110_1$ is not a highly latency sensitive virtual machine, while VM $110_2$ is a highly latency sensitive virtual machine. Networking software in kernel 136 determines the latency sensitivity of each virtual machine based on corresponding entries for the virtual machines in latency sensitivity table 155, as depicted in FIG. 2. In FIG. 5, PNIC 142 is a multi-queue PNIC with two transmit/receive queues: queue $501_1$ and queue $501_2$. For purposes of illustration, each of queues $501_1$ and $501_2$ is configured to transmit and receive data packets. As shown, queue $501_1$ has been allocated to transmit and receive data packets for VM $110_1$. Because VM $110_1$ is not highly latency sensitive, the interrupt rate for queue $501_1$ is not increased. Therefore, as shown in the figure, packets are accumulated in queue $501_1$ until an interrupt is generated. In one or more embodiments, an interrupt is generated for queue $501_1$ when the number of packets stored in the queue exceeds a threshold value, or when the packets have been stored in the queue beyond a threshold amount of time.

By contrast, kernel 136 determines that queue $501_2$, which is allocated to VM $110_2$, is allocated to a highly latency sensitive virtual machine. Therefore, in the embodiment depicted, kernel 136 increases the interrupt rate for queue $501_2$. This has the effect of suppressing the queuing of data packets in the queue. Thus, when a data packet is placed in the transmit queue of queue $501_2$, an interrupt is immediately generated, which causes the packet to be transmitted without any further delay (i.e., without waiting for other packets to be placed in the transmit queue of queue $501_2$). Further, if a packet arrives at PNIC 142 and is destined for VM 110₂, the packet is routed to the receive queue of queue 501₂, whereupon an interrupt is immediately generated, which causes kernel 136 to transmit the received packet to VM 110₂ without waiting for additional packets to be placed in the receive queue of 501₂. In this way, network latency for VM 110₂ is reduced as compared with the network latency experienced by VM 110₁.

Figure 6:
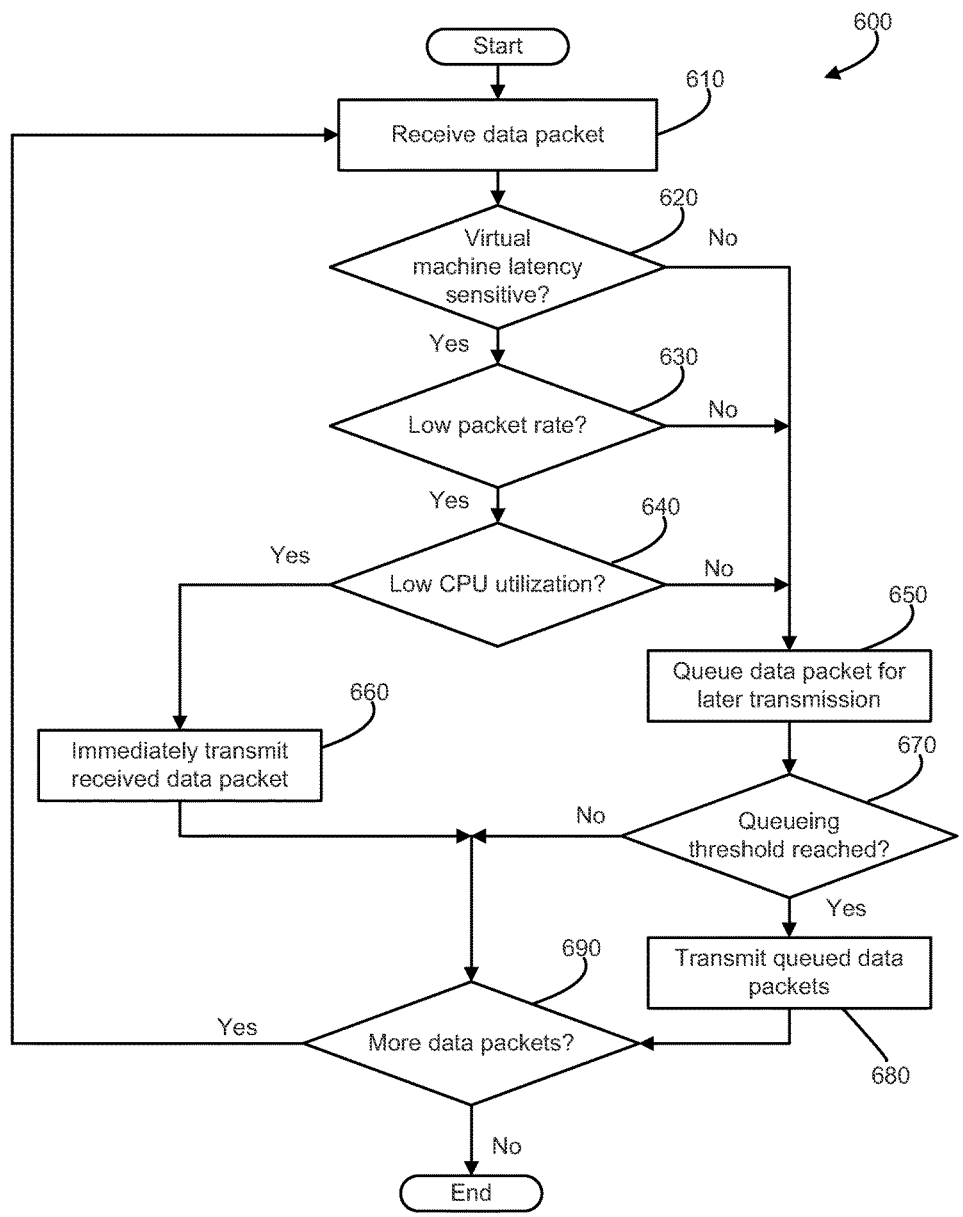
FIG. 6 is a flow diagram that illustrates a method for transmitting data packets by a VNIC for a latency sensitive virtual machine, according to embodiments.

FIG. 6 is a flow diagram that depicts an embodiment of a method 600 for transmitting data packets by a VNIC, where the mode of packet transmission is based on the latency sensitivity of the virtual machine to which the VNIC corresponds. In embodiments, method 600 is carried out by software that executes as part of the VNIC. Method 600 begins at step 610, where the VNIC receives a data packet. The received data packet is received from a transmitting application executing under control of the guest operating system of the virtual machine to which the VNIC corresponds. Alternatively, the data packet is received from the kernel, where the packet is to be transmitted to an application executing in the virtual machine.

After receiving the data packet at step 610, method 600 proceeds to step 620. At step 620, software that executes as part of the VNIC determines whether the virtual machine to which the VNIC corresponds (which is either the source or destination of the packet) is highly latency sensitive. In one or more embodiments, the VNIC determines the latency sensitivity of the virtual machine by inspecting a memory-based data structure, such as latency sensitivity data 143, which itself is based on latency sensitivity table 155. According to these embodiments, if an entry for the virtual machine in latency sensitivity stores a latency sensitivity indicator that is set to Y (or some other value that indicates that the virtual machine is latency sensitive), then the VNIC determines that the corresponding virtual machine is highly latency sensitive. If, however, the latency sensitive indicator is not set to Y, then the VNIC determines that the virtual machine is not highly latency sensitive.

If, at step 620, it is determined that the virtual machine is not highly latency sensitive, then method 600 proceeds to step 650, where the received packet is queued with other packets received by the VNIC, as described below. If, however, it is determined that the virtual machine is highly latency sensitive, then method 600 proceeds to step 630.

At step 630, the VNIC determines the rate at which packets are currently being transmitted and/or received by the VNIC. According to embodiments, when the packet rate is high, queuing of data packets is allowed to take place, even for highly latency sensitive virtual machines. The reason is that virtual machines that have high packet rates do not generally suffer when packets are delayed by queuing. For these virtual machines, the system-wide benefits of queuing (i.e., fewer context switches due to a decreased interrupt rate) outweigh the extra packet delay that packet queuing causes. If the VNIC packet rate is determined to be high (i.e., that, over a predetermined time period, a large number of packets are transmitted to the VNIC), then method 600 proceeds to step 650, where the received packet is queued with other packets received by the VNIC. If the VNIC packet rate is determined to be low (i.e., that, over a predetermined time period, a small number of packets are transmitted to the VNIC), then method 600 proceeds to step 640.

At step 640, the VNIC determines the CPU utilization of the corresponding virtual machine. According to embodiments, if the CPU utilization of a virtual machine (i.e., the utilization of the virtual CPUs of the virtual machine) is low, then such a virtual machine is often less likely to be compute-bound. That is, the virtual machine is less likely to be executing intensive computations (e.g., calculating prices of financial instruments in a high-speed trading system). Rather, the virtual machine is more likely to be I/O-bound. In other words, the virtual machine is most likely waiting for I/O operations to complete before engaging in computation. In such a scenario, it is important for the virtual machine to experience as little packet delay as possible. On the other hand, in the case of a compute-bound virtual machine, packet delay is relatively unimportant in comparison to any delays in CPU processing, even for virtual machines that are determined to be highly latency sensitive.

Therefore, at step 640, if the VNIC determines that the corresponding virtual machine has low CPU utilization (i.e., that the virtual machine is not compute-bound), then method 600 proceeds to step 660. Otherwise, if the VNIC determines that the virtual machine does not have low CPU utilization (i.e., that the virtual machine is in fact compute-bound), then method 600 proceeds to step 650, where the received data packet is queued with other received data packets.

At step 660, the VNIC immediately transmits the received data packet, thus minimizing packet delay (and eliminating any delay caused by packet queuing). This scenario is illustrated in FIG. 3, where VNIC 125₂ (which corresponds to VM 110₂) does not queue any data packets therein. Thus, the interrupt rate for the VNIC is higher than it would be if packets had been queued at the VNIC. After step 660, method 600 proceeds to step 690.

As shown in FIG. 6, step 650 is executed when the data packet is received for a virtual machine that is not highly latency sensitive, or when the virtual machine is highly latency sensitive, but has a high packet rate or high CPU utilization. At step 650, the received data packet is queued with other data packets already received at the VNIC for later transmission. According to embodiments, data packets in the VNIC are queued in a transmit queue (for packets outbound from the corresponding virtual machine) or in a receive queue (for inbound packets). The queuing of data packets is illustrated by VNIC 125₁ (which corresponds to non-highly latency sensitive virtual machine VM 110₁), depicted in FIG. 3.

After the received data packet is queued with other data packets for later transmission, method 600 then proceeds to step 670. At step 670, the VNIC determines whether a queuing threshold has been exceeded. For example, the VNIC may determine that either or both transmit and receive queues therein are full, or that the number of packets stored in the queues exceeds a predetermined value. In other embodiments, the VNIC determines that the packets have been stored in the queues for greater than some predetermined amount of time.

If, at step 670, the VNIC determines that the queuing threshold has not been exceeded, then method 600 proceeds directly to step 690. However, if the VNIC determines that the queuing threshold has been exceeded, then method 600 proceeds to step 680. At step 680, the queued packets are transmitted by the VNIC. For example, if the queued data packets are to be received by an application executing in the virtual machine, then the VNIC posts a software interrupt to the virtual machine, indicating that the packets are ready to be received by the virtual machine. On the other hand, if the packets are to be transmitted from the virtual machine to another virtual machine (via a virtual switch) or to a target application executing outside of the host computer (via a PNIC of the host computer), then the VNIC posts a software interrupt to the hypervisor (or, in some embodiments, the VNIC makes a kernel call to the hypervisor), indicating that the data packets are ready to be transmitted.

After transmitting the data packets at step 680, method 600 proceeds to step 690. At step 690, the VNIC determines whether more data packets should be received. In one or more embodiments, VNIC polls the virtual machine or the hypervisor to determine whether additional packets are available. The polling takes place at a predetermined interval. In other embodiments, the VNIC is enabled to receive a software interrupt from the virtual machine or the hypervisor indicating that additional data packets are ready to be received by the VNIC. If the VNIC determines that more data packets are to be received, then method 600 returns to step 610 to receive the data packet. Method 600 then cycles through the steps described above. If, however, the VNIC determines that there are no more data packets (or, alternatively, that the VNIC has been disabled for receiving data packets), then method 600 terminates.

Certain embodiments as described above involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) —CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s)

We claim:

1. In a host computer having a plurality of containers including a first container executing therein, the host including a physical network interface controller (physical NIC), a method of transmitting and receiving data packets to and from the first container, the method performed by a virtual network interface controller (virtual NIC) operating on a hypervisor of the host computer comprising:

detecting a packet handling interrupt upon receiving a first data packet that is associated with the first container;

determining, by inspecting a memory-based data structure that contains latency sensitivity data for each of the plurality of containers, whether the first container is latency sensitive;

if the first container is determined to be latency sensitive, then processing the packet handling interrupt by forwarding the first data packet to a virtual switch to which the virtual NIC is connected when the first data packet is received from the first container, or forwarding the first data packet to the first container when the first data packet is received from the virtual switch;

if the first container is determined to be not latency sensitive, then:

queuing the first data packet at the virtual NIC; and delaying processing of the packet handling interrupt by the virtual NIC.

2. The method of claim 1 wherein the first container is a first virtual machine.

3. The method of claim 2, wherein determining whether the first virtual machine is latency sensitive comprises:

reading from the memory-based data structure a latency sensitivity indicator for the first virtual machine; and determining whether the latency sensitivity indicator is a predetermined value.

4. The method of claim 3, wherein queuing the first data packet comprises storing the first data packet in a data structure associated with the virtual NIC that is configured to store a plurality of data packets.

5. The method of claim 4, further comprising:

determining whether a packet rate for the virtual NIC is less than a predetermined threshold rate;

if the packet rate for the virtual NIC is not less than the predetermined threshold rate, then queuing the first data packet and delaying processing of the packet handling interrupt; and if the packet rate for the virtual NIC is less than the predetermined threshold rate, then processing the packet handling interrupt.

6. The method of claim 4, further comprising:

determining whether a utilization value for one or more virtual processors of the first virtual machine is greater than a predetermined utilization value;

if the utilization value for the one or more virtual processors of the first virtual machine is greater than the predetermined utilization value, then queuing the first data packet and delaying processing of the packet handling interrupt; and if the utilization value for the one or more virtual processors of the first virtual machine is not greater than the predetermined utilization value, then processing the packet handling interrupt.

7. The method of claim 4, wherein the processing of the interrupt is delayed until the first data packet has been stored in the data structure greater than a predetermined amount of time.

8. The method of claim 4, further comprising:

wherein the processing of the packet handling interrupt is delayed until the data structure stores greater than a predetermined number of data packets.

9. The method of claim 2, wherein the first data packet is a first transmission control protocol (TCP) data packet, and queuing the first data packet comprises combining said first TCP data packet with one or more TCP packets previously received at the virtual NIC into a second TCP data packet.

10. The method of claim 2, wherein the physical NIC has a plurality of queues, each of which is associated with one or more of the plurality of virtual machines, and wherein the method further comprises: responsive to determining that the first virtual machine is latency sensitive, increasing an interrupt rate for the one or more queues of the physical NIC that are associated with the first virtual machine.

11. A non-transitory computer-readable medium comprising instructions executable by a host computer, the host computer having a plurality of containers including a first container executing therein, and the host including a physical network interface controller (physical NIC), where the instructions, when executed, cause the host computer to perform a method of transmitting and receiving data packets to and from the first container by a virtual network interface controller (virtual NIC) operating on a hypervisor of the host computer, the method comprising:

detecting a packet handling interrupt upon receiving a first data packet that is associated with the first container;

determining, by inspecting a memory-based data structure that contains latency sensitivity data for each of the plurality of containers, whether the first container is latency sensitive;

if the first container is determined to be latency sensitive, then processing the packet handling interrupt by forwarding the first data packet to a virtual switch to which the virtual NIC is connected when the first data packet is received from the first container, or forwarding the first data packet to the first container when the first data packet is received from the virtual switch;

if the first container is determined to be not latency sensitive, then:

queuing the first data packet at the virtual NIC; and delaying processing of the packet handling interrupt by the virtual NIC.

12. The computer-readable medium of claim 11, wherein the first container is a first virtual machine.

13. The computer-readable medium of claim 12, wherein determining whether the first virtual machine is latency sensitive comprises:

reading from the memory-based data structure a latency sensitivity indicator for the first virtual machine; and determining whether the latency sensitivity indicator is a predetermined value.

14. The computer-readable medium of claim 13, wherein queuing the first data packet comprises storing the first data packet n a data structure associated with the virtual NIC that is configured to store a plurality of data packets.

15. The computer-readable medium of claim 14, further comprising:

determining whether a utilization value for one or more virtual processors of the first virtual machine is greater than a predetermined utilization value;

if the utilization value for the one or more virtual processors of the first virtual machine is greater than the predetermined utilization value, then queuing the first data packet and delaying processing of the packet handling interrupt; and if the utilization value for the one or more virtual processors of the first virtual machine is not greater than the predetermined utilization value, then processing the packet handling interrupt.

16. A computing system, comprising
a host computer, the host computer having a plurality of containers including a first container executing therein; and
a physical network interface controller (physical NIC), wherein the system is configured to perform a method of transmitting and receiving data, packets to and from the first container by a virtual network interface controller (virtual NIC) operating on a hypervisor of the host computer, the method comprising:
detecting a packet handling interrupt upon receiving a first data packet that is associated with the first container;
determining, by inspecting a memory-based data structure that contains latency sensitivity data for each of the plurality of containers, whether the first container is latency sensitive;
if the first container is determined to be latency sensitive, then processing the packet handling interrupt by forwarding the first data packet to a virtual switch to which the virtual NIC is connected when the first data packet is received from the first container, or forwarding the first data packet to the first container when the first data packet is received from the virtual switch;
if the first container is determined to be not latency sensitive, then:
queuing the first data packet at the virtual NIC; and delaying processing of the packet handling interrupt by the virtual NIC.

* * * * *